United States Patent
Upadhyay et al.

(10) Patent No.: US 12,518,833 B2
(45) Date of Patent: Jan. 6, 2026

(54) METHOD AND APPARATUS TO REDUCE TIME TO PROGRAM SINGLE LEVEL CELL BLOCKS IN A NON-VOLATILE MEMORY

(71) Applicant: Intel NDTM US LLC, Santa Clara, CA (US)

(72) Inventors: Sagar Upadhyay, Folsom, CA (US); Aliasgar S. Madraswala, Folsom, CA (US); Bhavya Lokasani, Birmingham, AL (US); Pratyush Chandrapati, Folsom, CA (US); Tarek Ahmed Ameen Beshari, San Jose, CA (US)

(73) Assignee: INTEL NDTM US LLC, Santa Clara, CA (US)

( * ) Notice: Subject to any disclaimer, the term of this patent is extended or adjusted under 35 U.S.C. 154(b) by 0 days.

(21) Appl. No.: 18/371,900

(22) Filed: Sep. 22, 2023

(65) Prior Publication Data

US 2024/0013839 A1    Jan. 11, 2024

(51) Int. Cl.
| | |
|---|---|
| *G11C 16/10* | (2006.01) |
| *G11C 16/04* | (2006.01) |
| *G11C 16/08* | (2006.01) |
| *G11C 16/32* | (2006.01) |
| *G11C 16/34* | (2006.01) |

(52) U.S. Cl.
CPC ........ *G11C 16/102* (2013.01); *G11C 16/0433* (2013.01); *G11C 16/08* (2013.01); *G11C 16/10* (2013.01); *G11C 16/32* (2013.01); *G11C 16/3459* (2013.01); *G11C 2207/2272* (2013.01); *G11C 2207/229* (2013.01)

(58) Field of Classification Search
CPC ... G11C 16/102; G11C 16/0433; G11C 16/08; G11C 16/10; G11C 16/3459; G11C 7/222; G11C 16/32; G11C 2207/2272; G11C 2207/229; G11C 29/025; G11C 29/028; G11C 11/5628; G11C 16/0483
See application file for complete search history.

(56) References Cited

U.S. PATENT DOCUMENTS

| | | | |
|---|---|---|---|
| 10,224,107 B1 * | 3/2019 | Sule | G11C 16/12 |
| 2007/0047315 A1 | 3/2007 | Aritome | |

(Continued)

OTHER PUBLICATIONS

International Search Report and Written Opinion for PCT Patent Application No. PCT/US24/38177, Mailed Oct. 30, 2024, 10 pages.

*Primary Examiner* — Amir Zarabian
*Assistant Examiner* — Justin Bryce Heisterkamp
(74) *Attorney, Agent, or Firm* — Morgan, Lewis & Bockius LLP

(57) ABSTRACT

NAND performance is increased by reducing the time to perform program operations. An operation to program a portion of NAND cells in a NAND memory array includes multiple stages. NAND performance is increased by reducing the time in a first stage of the multiple stages to compute parameters that are used in a second stage to perform program operation(s) and verify operation(s). The time in the first stage is reduced by enabling dynamic prologue selection to dynamically select one of multiple sets of first stage operations to be performed in the first stage for a program operation based on the Word Line (WL), WL-Group, and block information for a current program operation and a previous program operation.

20 Claims, 10 Drawing Sheets

(56) References Cited

U.S. PATENT DOCUMENTS

| | | | | |
|---|---|---|---|---|
| 2011/0170353 A1* | 7/2011 | Nguyen | ................... | G11C 8/08 |
| | | | | 365/230.06 |
| 2015/0340099 A1* | 11/2015 | Kwak | .................. | G11C 29/028 |
| | | | | 711/103 |
| 2019/0018597 A1 | 1/2019 | Zhang et al. | | |
| 2019/0304543 A1 | 10/2019 | Sule et al. | | |
| 2021/0026557 A1 | 1/2021 | Cariello et al. | | |
| 2021/0383880 A1* | 12/2021 | Chava | ................... | G11C 16/30 |

* cited by examiner

804

METHOD AND APPARATUS TO REDUCE TIME TO PROGRAM SINGLE LEVEL CELL BLOCKS IN A NON-VOLATILE MEMORY

FIELD

This disclosure relates to non-volatile memory devices and in particular to Three-dimensional (3D) NAND Flash memory devices.

BACKGROUND

Non-volatile memory refers to memory whose state is determinate even if power is interrupted to the device. Storage devices that include non-volatile memory include a secure digital card, a multimedia card, a flash drive (for example, a Universal Serial Bus (USB) flash drive also known as a "USB thumb drive" or "USB memory stick" that includes non-volatile memory with an integrated USB interface), and a solid-state drive.

The non-volatile memory can comprise a block addressable memory device, such as NAND, or more specifically, multi-threshold level NAND Flash memory (for example, Single-Level Cell ("SLC"), Multi-Level Cell ("MLC"), Tri-Level Cell ("TLC"), Quad-Level Cell ("QLC"), or some other NAND). NAND Flash memory devices typically use a one-transistor memory cell that allows for high memory densities, high reliability, and low power consumption. The NAND Flash memory cell uses the threshold voltage of a floating-gate transistor to represent the data stored in the cell.

In a SLC NAND flash memory, each memory cell has two voltage levels corresponding to two states (0, 1) to represent one bit. In a MLC, TLC and QLC NAND flash memory, each memory cell stores more than one bit. Each cell in a MLC NAND flash memory uses four voltage levels corresponding to four states (00, 01, 10, 11) to represent 2 bits of binary data. Each cell in a TLC NAND Flash memory uses eight voltage levels corresponding to eight states (000 to 111) to represent 3 bits of binary data. Each cell in a QLC NAND Flash memory uses sixteen voltage levels corresponding to sixteen states (0000 to 1111) to represent 4 bits of binary data. Each cell in a TLC NAND Flash memory uses thirty two voltage levels corresponding to thirty two states (00000 to 11111) to represent 5 bits of binary data.

Read and program latency for SLC NAND flash memory is lower than for NAND flash memory with more than one bit per cell.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
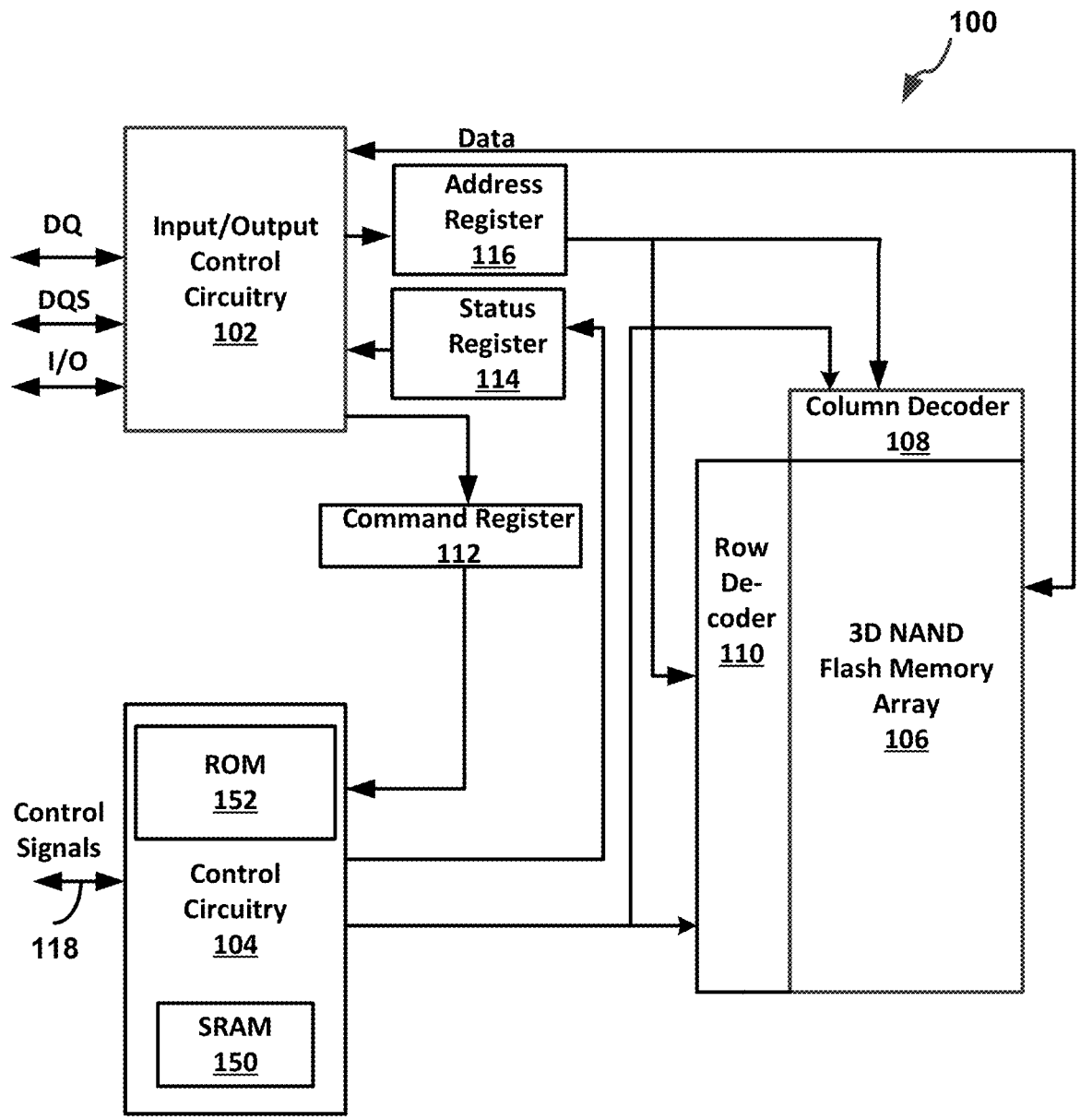
FIG. 1 is a block diagram of a Three-Dimensional (3D) NAND Flash memory device.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A 3D NAND device includes a 3D NAND Flash memory array that includes a plurality of NAND cells organized in rows and columns. A column is also referred to as a bit line. A row is also referred to as a word line. A NAND cell can include a transistor with a floating gate (for example, a high resistance poly gate) that stores charge indicative of one or more bit values.

A block of planar NAND Flash memory includes a grid of NAND cells connected by word lines (WLs) and bit lines (BLs). A word-line is a set of all NAND cells corresponding to one row across block bit-lines. A page is a set of bits corresponding to the same bit level in word-line. The number of pages per WL in the block is based on the type of memory cell. A single-level cell ("SLC") stores one bit of information per cell in one page (lower page). A multi-level cell ("MLC") stores two bits of information per cell in two pages (lower page, upper page). Data is stored as a threshold voltage of the NAND cell, based on the logical value (for example, logical 1 or logical 0 for a SLC; logical 00, 01, 10 or 11 for a MLC) that the NAND cell represents.

A string is a series of connected NAND cells in which the source of one NAND cell is connected to the drain of the next NAND cell. Strings are organized into pages which are then organized into blocks in which each string is connected to a separate line called a bit line. All NAND cells with the same position in the string are connected through control gates by a word line. A plane contains a certain number of blocks that are connected through the same bit line.

Data is programmed (written)/read from the NAND flash memory page-by-page. Only one NAND cell in the string is read at a time per bit line. To read one NAND cell per bit line, the transistors for the NAND cells in the bit line that are not being read are ON to allow the value from the NAND cell being read to propagate to the output. A Single-Level Cell (SLC) NAND (NAND cells are single-level cells) provides faster program speed and can be used as a cache to store data to be programmed later to slower multi-level (for example, MLC, TLC, QLC, PLC) NAND with a slower program speed than SLC NAND.

An operation to program a portion of NAND cells in a NAND memory array can include three stages: a first stage to compute program parameters (for example, voltages) used to perform program operation(s) (for example, a program voltage (Vpgm) that is applied to a selected word line and a pass gate read voltage (Vpassr) that is applied to non-selected word lines) and verify operation(s) (for example, a verify read voltage (V_Verify_Read) that is applied to the selected word line), a second stage to perform the program operation(s) and the verify operation(s) on the portion of NAND cells using the computed program parameters and a third stage to discharge excess charge from program circuitry, for example, turn off charge pumps for the portion of NAND cells (epilogue).

The first stage can be called a prologue and the third stage can be called an epilogue. The first stage can also include, a warmup or conditioning of charge pumps used to boost voltage for the NAND cells that are programmed using voltages that are higher than a supply voltage.

NAND performance is related to the time to program data to NAND cells in a memory array (tPROG), NAND performance can be increased by reducing the time in the first stage to compute parameters that are used in the second stage to perform program operation(s) and verify operation (s). The time can be reduced, for example, by skipping redundant calculations for other portions of NAND cells in the memory array that have similar physical characteristics, and thus, can be effectively programmed using the same program parameters. For example, the program parameters could be computed for a first of multiple, subblocks, and then the same program parameters could be applied for other subblocks of the same word line in the same block.

Computed parameters that are used to perform program operation(s) and verify operation(s) in the second stage can include a start voltage for the second stage, a voltage step size used by the second stage, and a maximum number of program operations and verify operations to be performed by the second stage. The computed parameters can be specific to program a first of multiple subblocks in a block or in a word line. Stored values for the parameters for the first subblock can be used during program of subsequent subblocks in the same word line of the same block instead of recalculating the parameters tor each subblock. For example, the percentage of the time taken by each section to perform program operations when the parameters are computed by the first stage for each program operation can be 42.8% (first stage), 53.2% (second stage), and 3.9% (third stage) of the operation time. The use of computed parameters during program of subsequent subblocks reduces the time to perform the program operations to 19.5% (first stage, 75% (second stage, and 5.5% (third stage).

The time in the first stage can be further reduced by enabling dynamic prologue selection to dynamically select one of multiple sets of first stage operations to be performed in the first stage for a program operation based on the Word Line (WL), WL-Group, and block information for the current program operation and the previous program operation.

Dynamic prologue selection can be enabled by (1) Setting the enable trim, and (2) by performing sequential single-level cell program operations. The multiple sets of first stage operations include a full first stage operation, a short first stage operation, a mini first stage operation and a fast first starve operation.

The full first stage operation includes a set of operations to compute all of the parameters that are used to perform program operation(s) and verify operation(s) in the second stage and to store parameters (computed parameters) in a volatile memory (for example, Static Random Access Memory (SRAM)). The stored parameters to be used by other first stage operations in the multiple sets of first stage operations.

The short first stage operation uses the parameters computed by the full first stage operation stored in the volatile memory and computes Dynamic Start Voltage (DSV) based updates for the program voltage (Vpgm) that is applied to a selected word line and for the pass gate read voltage (Vpassr) that is applied to non-selected word lines.

The mini first stage operation uses the parameters computed by the full first stage operation stored in the volatile memory by applying the Vpgm voltage on the selected WL, and an Inhibit Scheme on the unselected WLs. The Inhibit Scheme applies appropriate voltage biases on the unselected WLs such that the unselected WLs are not programmed and there is minimum disturb in the threshold voltage (Vt).

The fast first stage operation uses the computed parameters stored in volatile memory by the full first stage operation and does not perform any additional operations. Dynamic selection of full, shorter, mini and fastest first stage for each program operation based on the current and previous program's WL, WL-Group, and Block information improves the effective first stage time by 11.3% and effective program time (SLC tPROG) by 3.1% over the method that uses stored values for the parameters for the first subblock during program of subsequent subblocks in the same word line of the same block.

After dynamic prologue selected is enabled, the first program on a Word-Line-Group Program (WGP) is the full first stage operation with the longest program time (tPROG), the second program is the short first stage operation with a shorter tPROG, all subsequent programs are fast first stage operations with the shortest tPROG, and the first program for the next WL is the mini first stage operation with slightly longer tPROG compared to the fast first stage operation.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of a Three-Dimensional (3D) NAND device 100. The 3D NAND device 100 includes Input/Output Control circuitry 102 and control circuitry 104 that are coupled to a host memory controller (not shown) via a plurality of control and data signals. The 3D NAND device 100 also includes a 3D NAND Flash memory array 106 that includes a plurality of NAND cells organized in rows and columns.

A row decoder 110 and a column decoder 108 are provided to decode address signals to access the 3D NAND Flash memory array 106. The 3D NAND device 100 further includes input/output control circuitry 102 to manage input of commands, addresses, and data to the 3D NAND device 100 and the output of data and status information from the 3D NAND device 100. An address register 116 is in communication with input/output control circuitry 102, and row decoder 110 and column decoder 108, to latch the address signals prior to decoding. A command register 112 is in communication with input/output control circuitry 102 and control circuitry 104 to latch incoming commands.

Control circuitry 104 controls access to the 3D NAND Flash memory array 106 in response to the commands and generates status information that is stored in status register 114. Control circuitry 104 is in communication with row decoder 110 and column decoder 108 to control the row decoder 110 and column decoder 108 in response to the addresses.

The Open NAND Flash Interface (ONFI) is a standard that defines the operation of the data bus and the control signals. The ONFI standard supports an 8-bit or 16-bit data bus (two independent 8-bit data buses) and up to four NAND die in a package.

The Input/Output Control circuitry 102 in the 3D NAND device 100 communicates with the host memory controller via a bidirectional data bus (DQ) and a bidirectional data strobe (DQS) signal. The DQS signal is used to indicate a data valid window. The control circuitry 104 in the 3D NAND device 100 receives control signals 118 from the host memory controller. The control signals 118 that are received include chip enable (CE #) to select the 3D NAND device 100 for data transfer with the host memory controller, Address Latch Enable (ALE) to indicate the type of bus cycle (command, address or data), Command Latch Enable (CLE) to indicate the type of bus cycle (command, address or data), Read Enable (RE #), Write Enable (WE #), and Write Protect (WP #) to disable program and erase operations. The 3D NAND device 100 also includes control signals 118 output by control circuitry 104 that include a Ready/Busy (R/B #) signal to indicate whether the 3D NAND device 100 is executing an operation ("busy") or is ready for a next operation.

Control circuitry 104 includes a Static Random Access Memory (SRAM) 150 to store computed parameters used to program NAND cells in the 3D NAND device 100 and a Read Only Memory (ROM) 152 to store firmware.

It will be appreciated that the memory device of FIG. 1 may include additional circuitry and signals, and that the functional blocks of the memory device may not necessarily be segregated as shown in this example case. For example, a single component or component portion of an integrated circuit device could be adapted to perform the functionality of more than one block component of FIG. 1. Alternatively, or in addition, functionality of a single block component of FIG. 1 may be distributed into multiple blocks. Additionally, while specific I/O pins are described in accordance with popular conventions for receipt and output of the various signals, it is noted that other combinations or numbers of I/O pins may be used in the various embodiments. Many variations will be appreciated.

Figure 2:
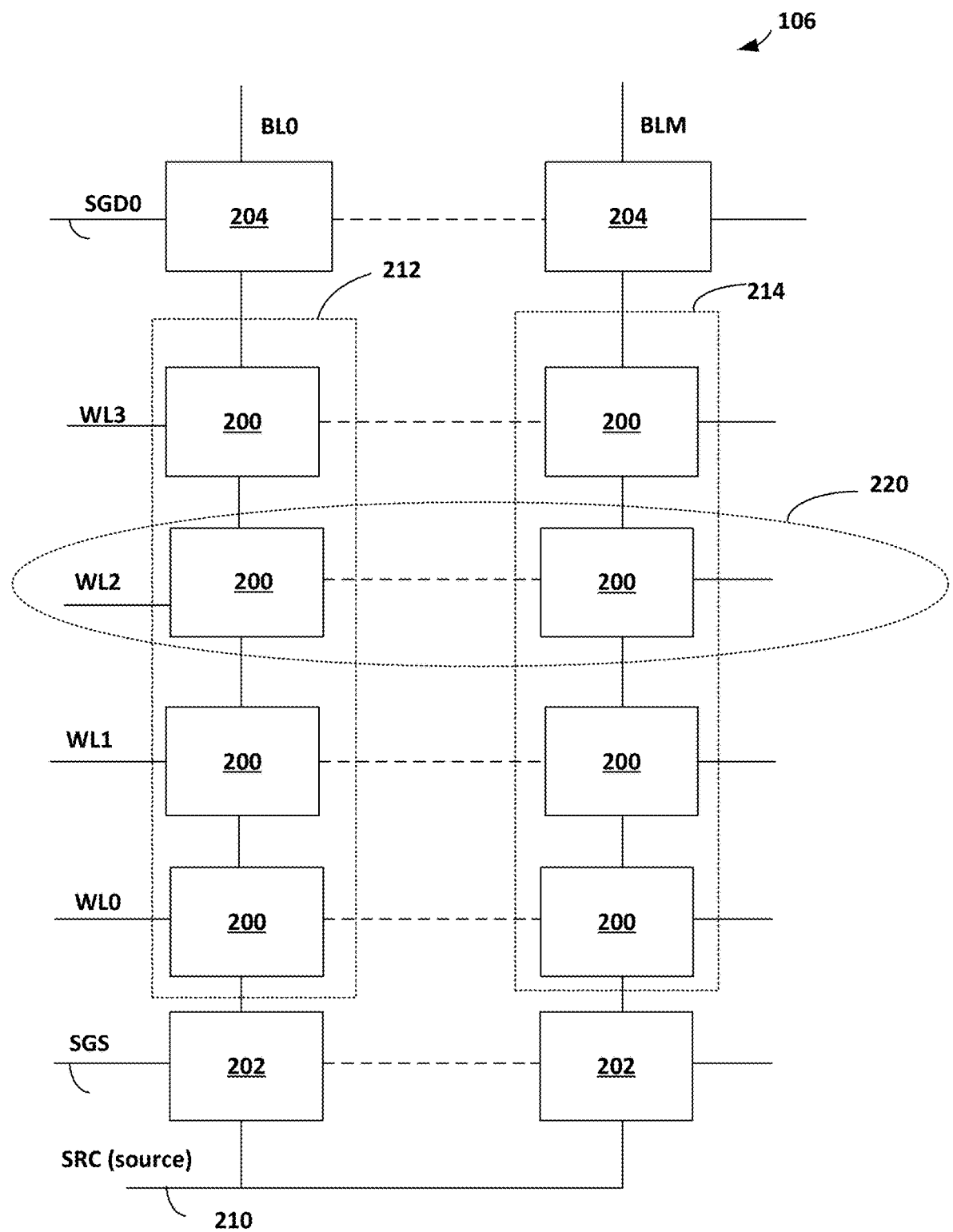
FIG. 2 is a block diagram illustrating a plurality of NAND cells in the 3D NAND Flash memory array shown in FIG. 1.

FIG. 2 is a block diagram illustrating a plurality of NAND cells in the 3D NAND Flash memory array 106 shown in FIG. 1. Each of the plurality of NAND cells 200 in the 3D NAND Flash memory array 106 is connected to a word line (WL) and a bit line (BL). A NAND cell 200 can be selected via the BL and the WL. Four word lines labeled W0-W3 and two bit lines labeled BL0, BLM are shown in FIG. 2. A pillar is a bit line or string that connects the word lines.

In a 3D NAND Flash memory array 106 that includes SLC NAND cells, each NAND cell 200 can store one bit. In a 3D NAND Flash memory array 106 that includes QLC NAND cells, each NAND cell 200 can store four bits, one bit per page (upper, lower, extra, top). In a 3D NAND Flash memory array 106 that includes TLC NAND cells, each NAND cell 200 can store three bits, one bit per page (upper, lower, top). In a 3D NAND Flash memory array 106 that includes Penta-Level Cells (PLC) NAND cells, each NAND cell 200 can store five bits. The plurality of NAND cells 200 are arranged in a two-dimensional (2D) array of strings and tiers. Two 2D array of a string of NAND cells 212, 214 and four tiers WL0-WL3 are shown in FIG. 2.

Each string of NAND cells 212, 214 is coupled to a source line (SRC) 210 using a respective source-side select gate (SGS) 202 and to a respective bit line BL0, BLM using a respective drain-side select gate (SGD) 204. In the example shown there are 4 tiers, other examples can include strings of NAND cells having more or fewer tiers or bit lines.

The 3D NAND Flash memory array 106 is divided into blocks with each block divided into pages. Each page comprises a plurality of NAND cells 200 that share a word line. As shown in FIG. 2, all of the NAND cells 200 in page 220 are coupled to WL2. A block includes the NAND strings that share the same group of word lines. The block is the smallest erasable unit of NAND cells in the 3D NAND device. In a block erase operation, a group of consecutive pages is erased in a particular operation. Erase operates on an entire block of NAND cells 200 and sets all the NAND cells in the block to a logical "1".

To program (write) data to a page 220, a program voltage (Vpgm) is applied to the selected word line (WL2) and thus, to a control gate of each NAND cell 200 coupled to the selected word line. While the program voltage (Vpgm) is applied to the selected word line, a potential, such as a ground potential, can be applied to the bit lines of the NAND cells 200 in the page 220, resulting in a charge transfer to a floating gate of each NAND cell 200 in the page 220. A pass voltage (Vpass) can be applied to one or more word lines (for example, WL3, WL1, WL0) in the block having NAND cells 200 that are not being programmed and a 2 Volts to about 3 Volts inhibit voltage can be applied to bit lines having NAND cells 200 that are not being programed to inhibit charge from being transferred to the floating gates of the NAND cells 200 that are not selected for programming.

To erase a block of NAND cells 200, a 18 Volts to about 20 Volts erasure voltage is applied between the sources and drains of the NAND cells 200 in the block using one or more bit lines and select gates while the word lines of the targeted NAND cells 200 are kept at a ground potential resulting in a charge transfer from the floating gates of the NAND cells in the block. An erase operation is the process of removing electrons from the floating gates to change the state of cell to logical "1". A large erasure voltage, for example, 20 Volts is required to repel the electrons from the floating gate.

Figure 3:
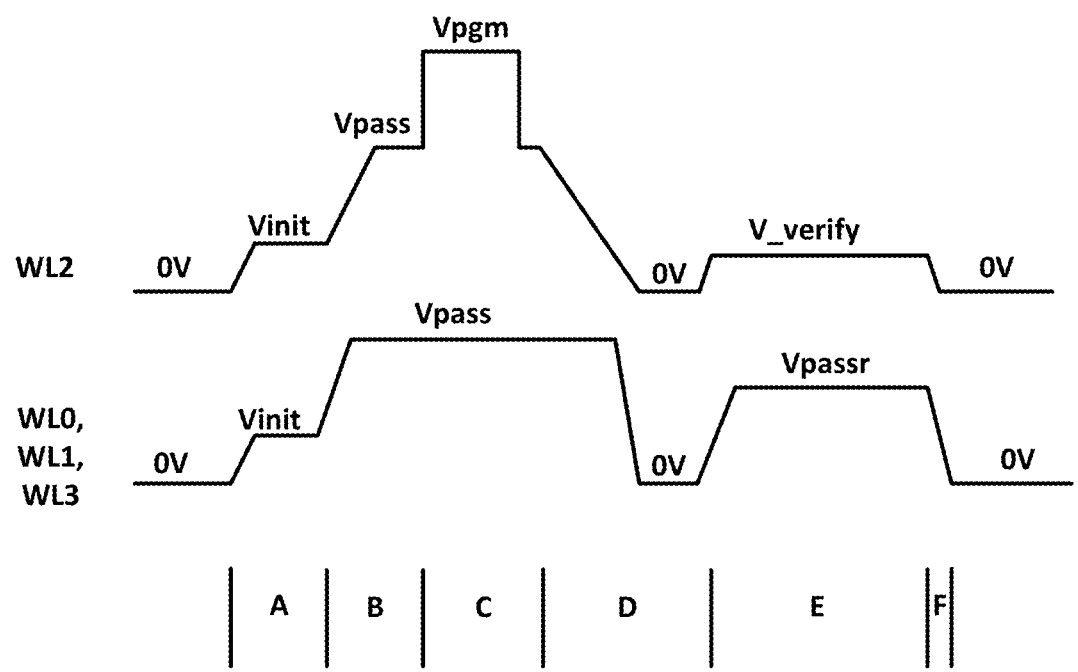
FIG. 3 is a timing diagram illustrating voltages applied to selected word line WL2 and non-selected word lines WL0, WL1, WL3 to program the selected word line WL2.

FIG. 3 is a timing diagram illustrating voltages applied to selected word line WL2 and non-selected word lines WL0, WL1, WL3 to program the selected word line WL2.

Referring to FIG. 3, during time period A, an initialization voltage Vinit is applied to selected word line WL2 and unselected word lines WL0, WL1, WL3 to discharge remaining charge in the NAND cell channel.

During time period B, the voltage is slowly increased to a pass gate voltage Vpass on the selected word line WL2 and non-selected word lines WL0, WL1, WL3.

During time period C, the voltage applied to the selected word line WL2 is a program voltage Vpgm to program the NAND cells 200 in the selected word line WL2 while the pass gate voltage Vpass continues to be applied to the non-selected word lines WL0, WL1, WL3.

During time period D, the program voltage Vpgm applied to selected word line WL2 and the pass gate voltage Vpass applied to the non-selected word lines WL0, WL1, WL3 is discharged.

During time period E, the programmed NAND cells in selected word line WL2 are verified by applying a verify read voltage V_Verify_Read to the selected word line WL2 while a pass gate read voltage Vpassr is applied to the non-selected word lines WL0, WL1, WL3.

The operations performed during time periods C, D and E can be repeated with increasing voltage values until there is a successful verify of the programmed NAND cells or until a maximum number of program-verify operations in the selected word line WL2 has been reached.

During time period F, the verify read voltage V_Verify_Read applied to selected word line WL2 and the pass gate read voltage Vpassr applied to the non-selected word lines WL0, WL1, WL3 are discharged.

Figure 4:
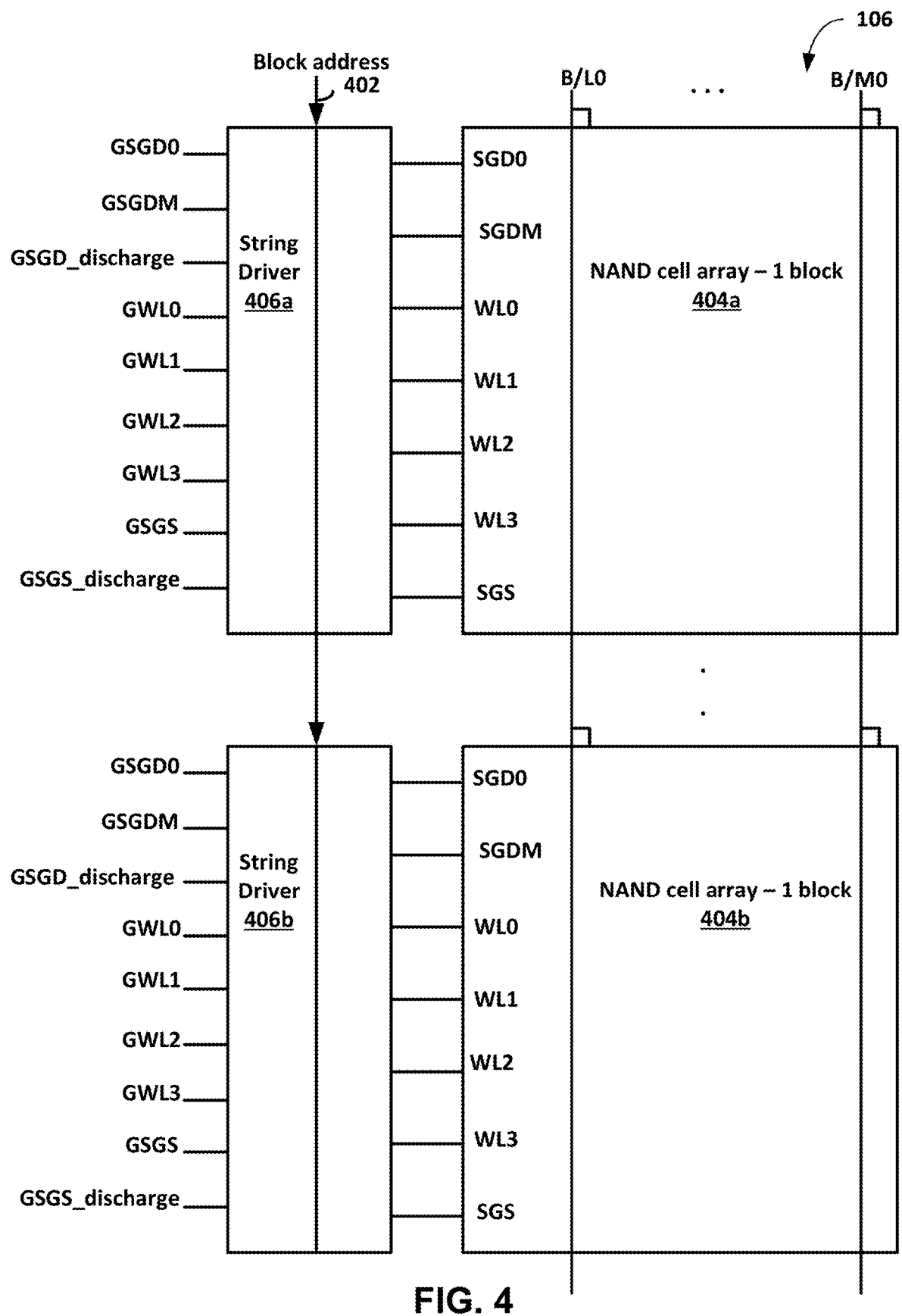
FIG. 4 is a block diagram illustrating blocks of NAND cells in the 3D NAND Flash memory array shown in FIG. 1.

FIG. 4 is a block diagram illustrating blocks of NAND cells in the 3D NAND Flash memory array 106 shown in FIG. 1. Each block of NAND cells 404a, 404b has a respective string driver 406a, 406b that includes switches that when enabled by the block address 402 allow the voltage applied to the global word lines to be applied to the respective word lines.

Figure 5:
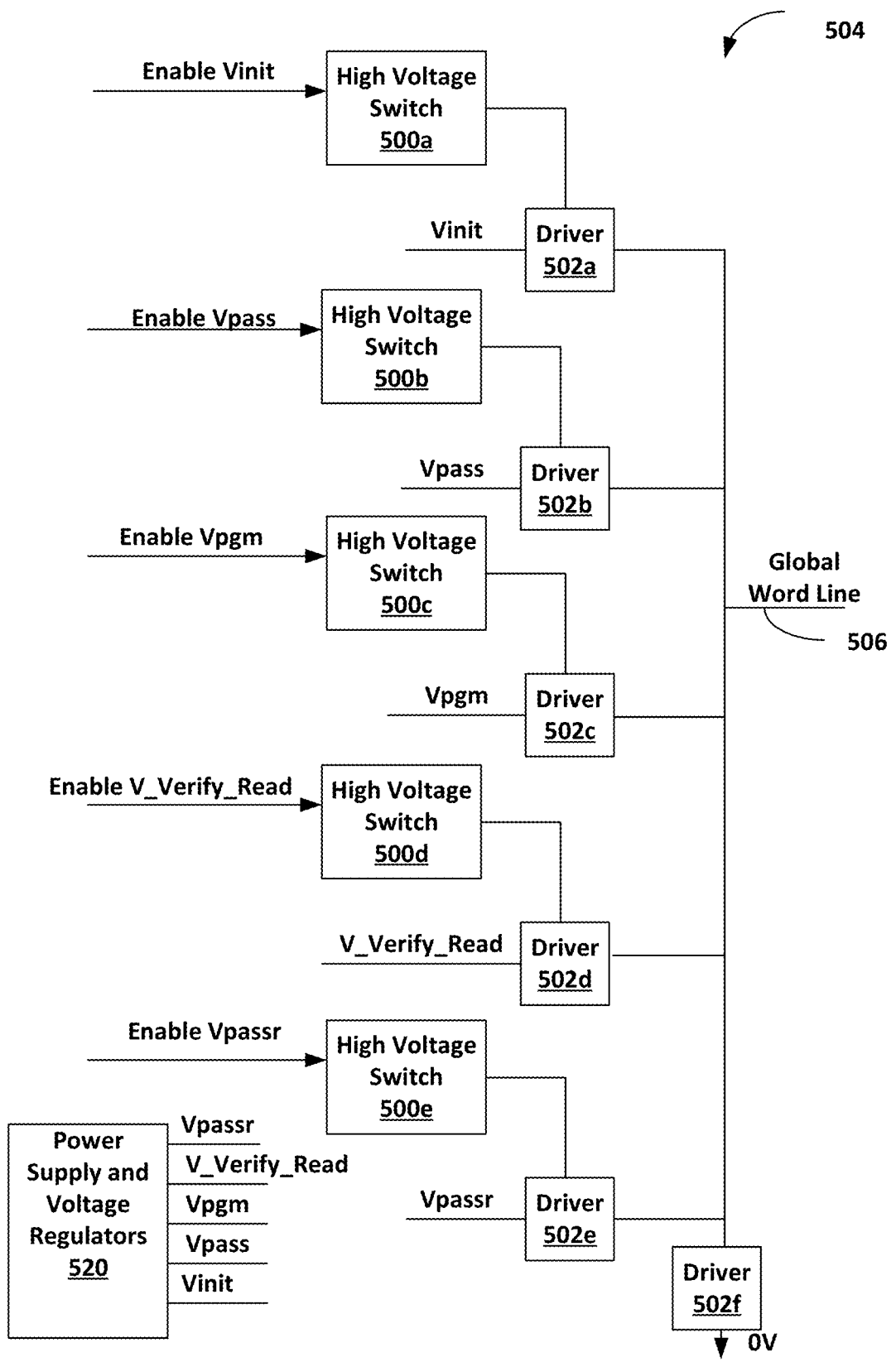
FIG. 5 is a block diagram of control circuitry to select one of a plurality of voltages from a power supply for a global word line.

FIG. 5 is a block diagram of control circuitry 504 to select one of a plurality of voltages from a power supply and voltage regulators 520 for a global word line 506. The control circuitry includes a plurality of high voltage switches 500a-e and a plurality of global word line drivers 502a-e to enable one of the plurality of global word line drivers 502a-e to drive the selected voltage onto the global word line 506.

The selected voltage can be one of Vinit (an initialization voltage, for example, 2 Volts), Vpgm (a program voltage, for example, 20 Volts), Vpass (a pass gate voltage, for example, 7 Volts), V_Verify_Read (a verify read voltage, for example, 0-5V), or Vpassr (a pass gate read voltage, for example, 7 Volts)

The global word line 506 can be selectively coupled to multiple word lines in the 3D NAND Flash memory array 106.

Figure 6:
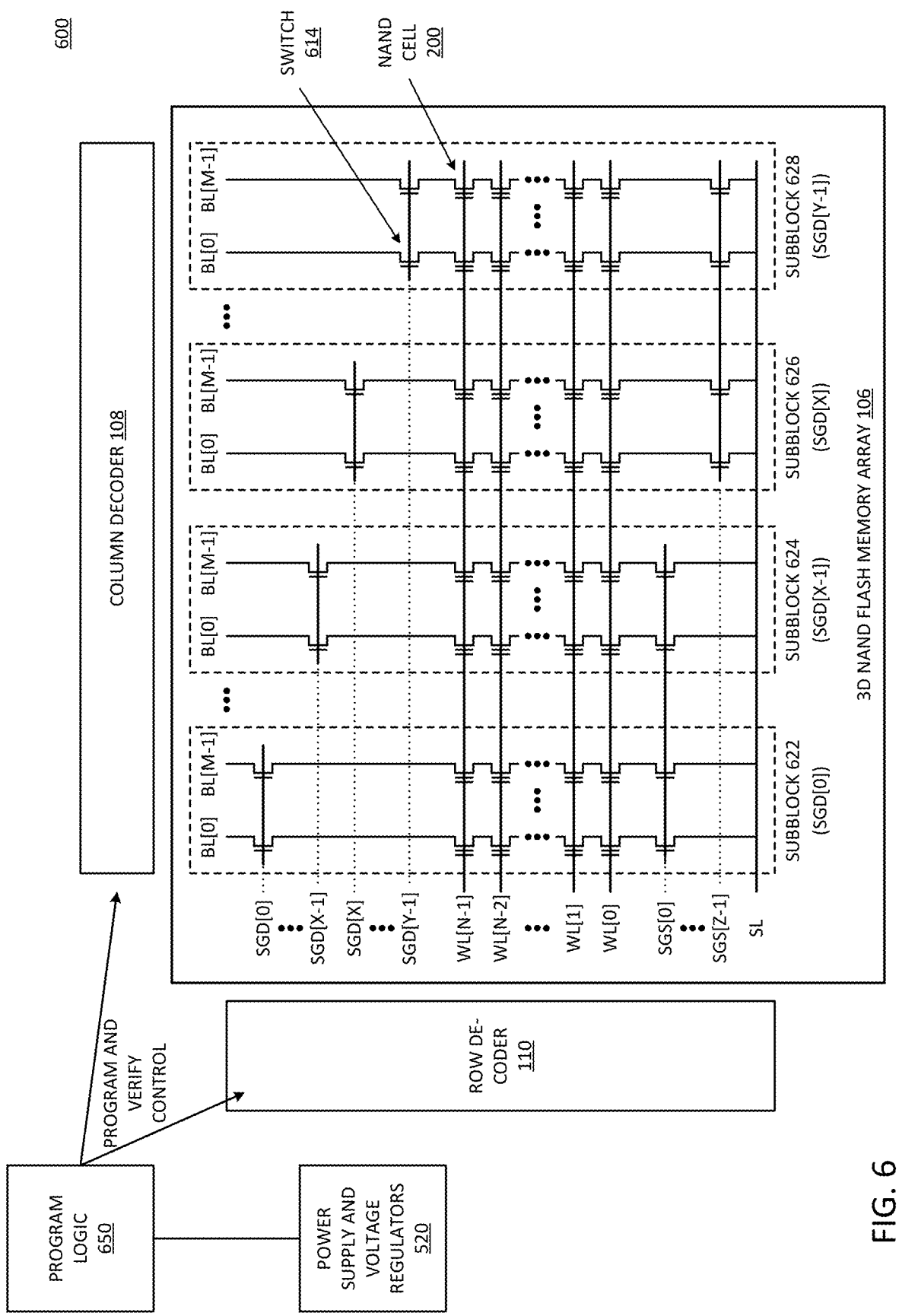
FIG. 6 is a block diagram of an example of a system that includes a 3D NAND flash memory array with a subblock architecture, where a program parameter can be applied to different subblocks after being computed for a first subblock.

FIG. 6 is a block diagram of an example of a system 600 that includes a 3D NAND flash memory array 106 with a subblock architecture, where a program parameter can be applied to different subblocks after being computed for a first subblock. In one example, system 600 is or is included in a solid state drive (SSD). System 600 can be integrated into a computing device.

3D NAND flash memory array 106 includes NAND cells 200. In one example, 3D NAND flash memory array 106 represents a 3D stacked memory device. In one example, NAND cells 200 are SLC NAND cells. 3D NAND Flash Memory array 106 includes N word lines (WL[0] to WL[N-1]). N can be, for example, 32, 48, 64, or some other number. In one example, 3D NAND flash memory array 106 is segmented into subblocks. Subblocks 622, 624, 626, and 628 are illustrated, but are only to be understood as illustrative and not limiting. Segmentation of the 3D NAND Flash memory array 106 into different subblocks can include segmenting into any number of subblocks.

In one example, a subblock refers to the columns, pillars, or strings of NAND cells 200 that are accessed together. The pillars or vertical channels can be accessed together by responding to a common switching signal. The switching signal can refer to gating control for the pillar. For example, the various pillars can be controlled by select gate drain (SGD) signal lines and select gate source (SGS) signal lines. Switches 614 represent the switching elements that can selectively apply the SGD and SGS signaling. An SGD signal line selectively couples a column to a bit line (BL). An SGS signal line selectively couples a column to a source line (SL). The source line (SL) can be a source layer of material integrated onto a semiconductor substrate.

In one example, each subblock includes M bit lines (BL[0] to BL[M-1]). In one example, each storage cell 200 within 3D NAND Flash Memory array 106 is addressed or selected by asserting a word line and a bit line, in conjunction with enabling the column with the gate select switches 614 (shown only on SGD, but SGS switches can be considered included in the control).

As specifically illustrated, 3D NAND Flash Memory array 106 includes SGD[0] to control selection of columns in subblock 622, SGD[X-1] to control selection of columns in subblock 624, SGD[X] to control selection of columns in subblock 626, and SGD[Y-1] to control selection of columns in subblock 628. In one example, multiple subblocks share a common source selection. Thus, for the Y SGD signal line illustrated, there are only Z SGS signal lines (SGS[0] to SGS[Z-1]), where Z is understood to be less than Y. In one example, 3D NAND Flash Memory array 106 includes the same number of SGS signal lines as SGD signal lines. As illustrated, SGD is segmented to provide separate control for the different subblocks, with one SGD segment per subblock. Likewise, SGS is segmented, with one SGS segment providing control for multiple subblocks.

System 600 includes column decoder (column decode circuitry) 108 to determine from a received command which bit line or bit lines to assert for a particular command. Row decoder (row decode circuitry) 110 represents a row address decoder to determine from a received command which word line or word lines to assert for the command.

System 600 operates based on power received from power supply and voltage regulators 520. Power supply and voltage regulators 520 represents one or more voltage sources or voltage levels generated within system 600 to power electronic components of an electronic device, which can include system 600. Power supply and voltage regulators 520 can generate different voltage levels, either as multiple voltage levels from a single voltage supply, or different voltage levels from different voltage supplies. Power supply and voltage regulators 520 can generate multiple program voltages and an inhibit voltage.

System 600 includes circuitry to apply different voltage levels to different layers of the column stack. In one example, column decoder 108 and row decoder 110 provide circuitry to apply the various voltages to the various columns and layers of the stack. System 600 can include other circuitry to apply the voltages to the different signal lines or layers of the stack. For example, system 600 can apply high or low voltage levels to the select lines (e.g., SGS, SGD) or to various word lines, or to a combination of word lines and select lines. The application of the voltages to the select lines can determine whether the switches 614 are open or closed, thus selectively deselecting (open switches) or selecting (closed switches) the columns. The application of voltage to the word lines can determine whether the individual storage cells 200 receive charge, provide charge, or are shut off from the charge.

In one example, system 600 includes program logic 650 coupled to power supply and voltage regulators 520. Program logic 650 represents logic executed by a media controller or control circuitry 104 of the Three-Dimensional (3D) NAND device 100 to program NAND cells 200. Program logic 650 provides dynamically selectable operations to select program parameters in accordance with any description herein.

Program logic 650 can trigger the programming of multiple sequential subblocks of the same block of Three-Dimensional (3D) NAND flash memory array 106, computing program parameters for the first subblock, and then applying the same program parameters for other subblocks. In one example, program logic 650 does not need to compute the program parameters again until programming a subblock that is in a different block or that has different physical characteristics that will need different program parameters for good write performance.

Figure 7:
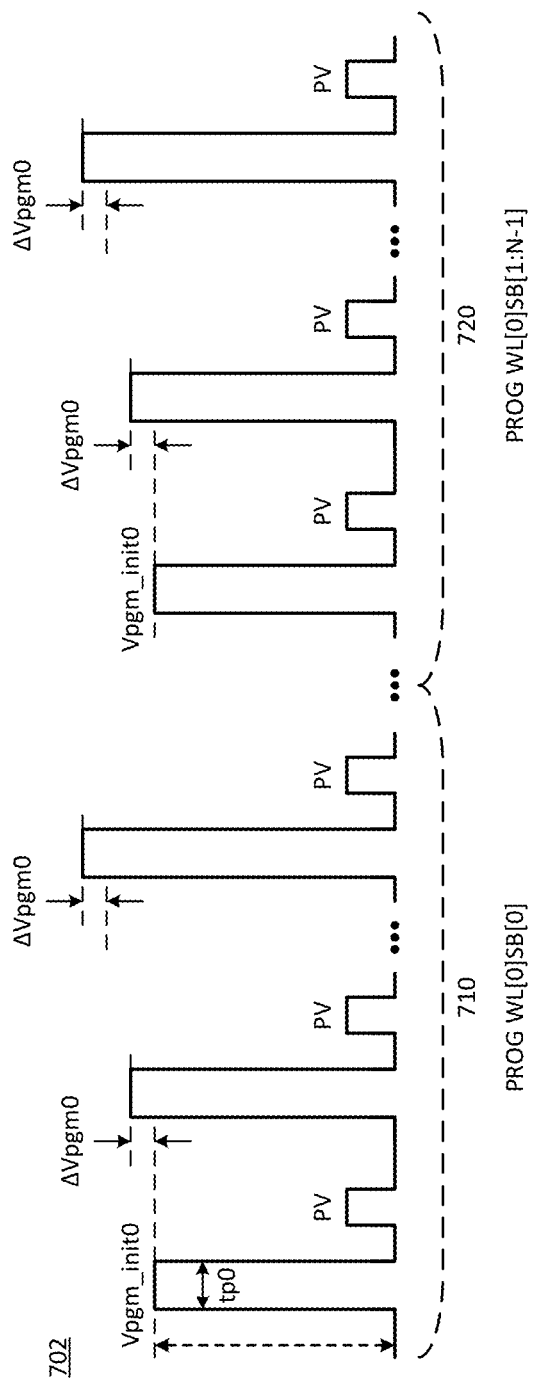
FIG. 7 is a diagram of an example of a program operation for multiple subblocks of the same block.

FIG. 7 is a diagram of an example of a program operation for multiple subblocks of the same block. Program sequence 702 illustrates the general form of the program operation for multiple subblock of the same block that can be applied by controller circuitry 104. The program sequence 702 illustrates various program parameters for the program sequence of the Three-Dimensional (3D) NAND flash memory array 106.

Regarding the program sequence 702, controller circuitry 104 computes the program parameters in a first stage of program operation. During the first stage of the program operations, controller circuitry 104 computes the program parameters for the first word line (WL[0]) and the first subblock (SB[0]). While the word line is specifically mentioned, in one example, a block or other division of the Three-Dimensional (3D) NAND flash memory array 106 can be used in addition to, or in place of, the word line. The dashed line represents the computed starting voltage, Vpgm_init0, for the programming of WL[0]SB[0].

After computation of the program parameters, the controller circuitry 104 can initiate the second stage of the program operation to perform the program operation(s) and the verify operation(s) on the portion of NAND cells using the computed program parameters. Thus, after computing the initial program voltage (Vpgm_init0), controller circuitry 104 can generate the first program pulse in program sequence 702. In one example, other parameters that controller circuitry 104 can compute include the pulse width (tp0) of the program pulse, and the program pulse step (ΔVpgm0). Program sequence 702 illustrates that after the first pulse at the initial program voltage, controller circuitry 104 can generate a program verify pulse (labeled PV) in program sequence 702.

The program pulse (Vpgm) typically increases in amplitude as the number of program and verify pulses increase in the second stage of the program operation to perform the program operation(s) and the verify operation(s). Thus, the first pulse can have an amplitude of Vpgm_init0 and the voltage of each subsequent program pulse can increase by ΔVpgm0, which can be referred to as a program loop voltage step size. Phase 710 illustrates the second stage of the program operation to perform the program operation(s) and the verify operation(s) for WL[0]SB[0]. The number of program pulses and program verify (PV) pulses can be one or more, depending on the configuration of the system. When the verify operation indicates the program executed correctly, controller circuitry 104 does not need to increase by ΔVpgm0 and send another program pulse followed by a program verify pulse. Rather, the controller circuitry 104 can proceed to program the next subblock for WL[0]. In one example, there is a maximum number of program pulses for the program operation, which can be a parameter computed by controller circuitry 104 in the first stage to compute program parameters. Such a maximum can be referred to as a maximum number of program verify loops.

With the application of a first stage to compute program parameters, in one example, controller circuitry 104 recognizes that the next program operations will be for the same wordline (WL[0]), for N−1 additional subblocks (SB[1:N−1]). Phase 720 represents the programming of the additional subblocks. In one example, controller circuitry 104 does not compute the program parameters again in the first stage of subsequent program operations for WL[0]SB[1:N−1]. Rather, controller circuitry 104 uses a shorter first stage to load the program parameters computed for SB[0] to apply to each additional SB[1:N−1].

Figure 8:
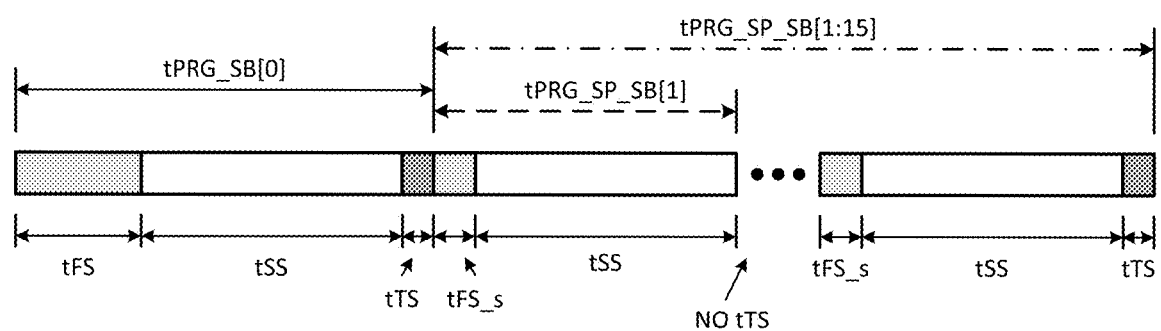
FIG. 8 is a diagram of an example of a program operation that computes program parameters for the first word line and the first subblock and uses the computed program parameters for subsequent program operations for the other subblocks in the first word line.

FIG. 8 is a diagram 804 of an example of a program operation that computes program parameters for the first word line and the first subblock and uses the computed program parameters for subsequent program operations for the other subblocks in the first word line. The controller circuitry 104 applies a stored computed parameter for subsequent subblocks after computing the parameter for the first subblock of a group of subblocks.

Diagram 804 assumes that there are 16 subblocks [SB[0-15]] per block. Other implementations can have more or fewer than 16 subblocks per block. Additionally, diagram 804 assumes sequential program operations to all 16 subblocks. In the case that fewer than all of the subblocks are programmed sequentially, there can be a number of subblocks to which the stored computed parameter is applied, and a number of subblocks in the block to which it is not applied because the subblocks are not programmed sequentially with the first blocks. Additionally, in such a scenario, there is no requirement that the "first" subblock programmed (written) to the block for which the parameters are computed does not necessarily have to be the first subblock of the block (that is, subblock with address 0). Reference to Subblock[0] or SB[0] can refer to the subblock with address zero, or simply the subblock first written in a sequence of subblocks (typically the subblock with the lowest address of the subblocks being written).

Diagram 804 illustrates the program operation for SB[0], having a time of tPRG_SB[0], which includes tFS (the first stage (FS) time), tSS (the second stage time (time for the program-verify loop)), and tTS (the third stage time).

In diagram 804, the controller circuitry 104 can apply a shortened first stage. The controller circuitry 104 calculates the parameters to program SB[0] and applies the same calculations for SB[1:15]. Thus, to program SB[1] in diagram 804, the controller circuitry 104 can skip at least some parameter computations, and thus, the first stage time can be tFS_s, referring to a shortened first stage time. In one example, the shortened first stage can be up to approximately ⅔ or ¾ less than the normal first stage time. The time to program SB[1] in diagram 804 is designated as tPRG_FS_s_SB[1], referring to a time to program SB[1] with a shortened first stage time ("FS_s"). tPRG_FS_s_SB[1] includes tFS_s and tSS. In one example, tPRG_FS_s_SB[1] does not include the third stage time. In one example, the third stage is only needed after the last subblock has been programmed. Thus, the program operation of SB[15] can include the third stage, which may be the only third stage for the programming of SB[1:15].

In another example, the third stage can be included in the shortened program operation and only the first stage is different. It will be understood that removing the third stage can further shorten the first stage by keeping charge pumps and other circuitry enabled and ready. Without discharging the charge pumps, there will be a reduction in first stage time that would otherwise be needed to charge the charge pumps. By performing the third stage each time, the shortened first stage will still be shorter relative to a normal first stage but could be further shortened as described above.

The time for programming the other subblocks will be the same or comparable to SB[1]. The entire time to program the entire block can be tFS_SB[0]+tPRG_SP_SB[1:15], which will be substantially less than 16*tPRG_SB[0]. Thus, as illustrated between the program sequences, tFS_s<tSS, tPRG_SP_SB[1]<tPRG_SB[1], and tPRG_SP_SB[1:15] <tPRG_SB[1:15].

Figure 9:
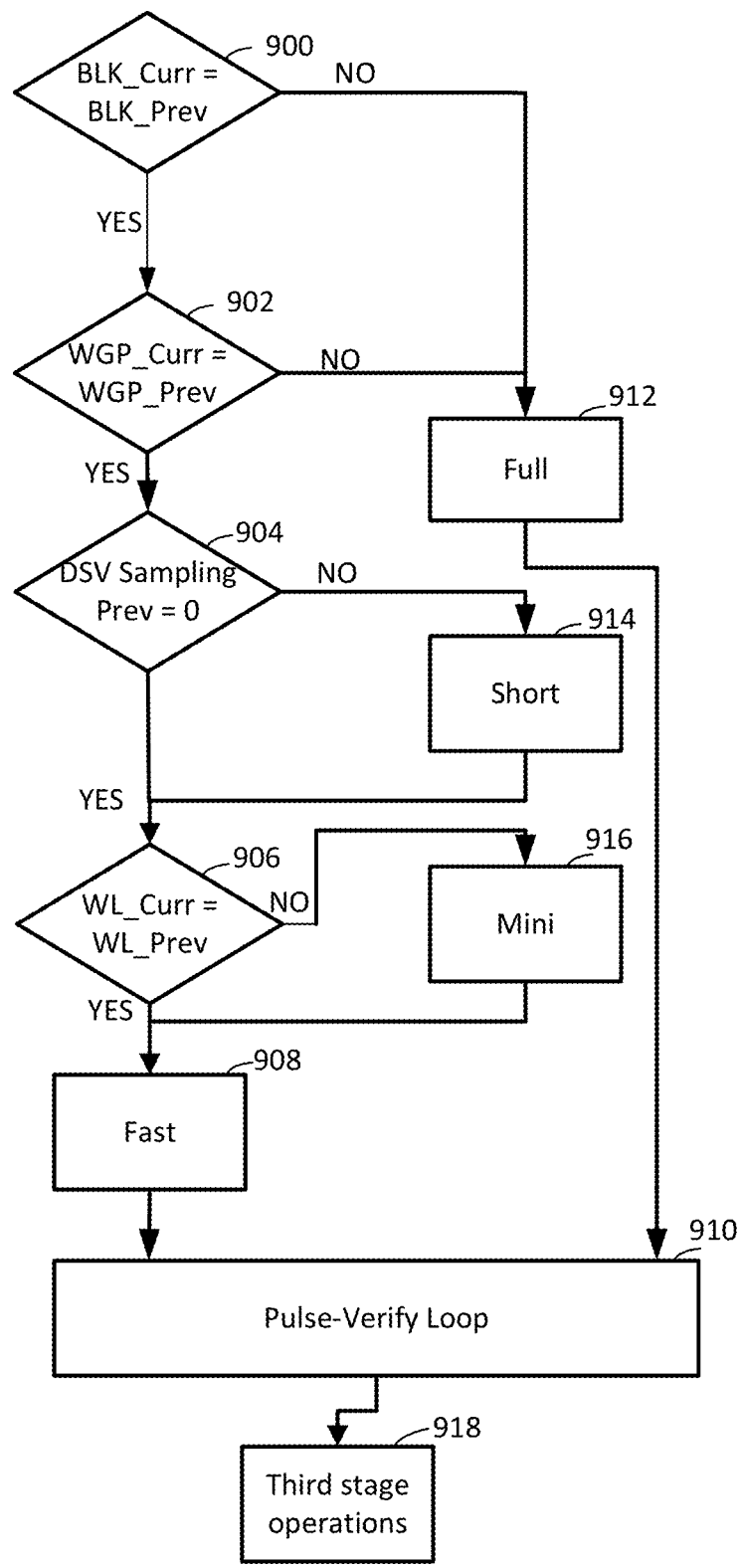
FIG. 9 is a flowgraph illustrating a method to dynamically select program parameters to perform a program operation in a Single-Level Cell (SLC) NAND Flash memory device.

FIG. 9 is a flowgraph illustrating a method to dynamically select program parameters to perform a program operation in an SLC NAND Flash memory device. Program parameters used to perform a previous program operation are stored in SRAM 150. The parameters are associated with program operations to program SLC NAND cells in the SLC NAND Flash memory device. The current program operation is a single-level cell program operation in the SLC NAND Flash memory device. The program parameters for the previous program operation include a block number, a word line (WL) Group Program (WGP) number, a word line (WL) number used to perform the previous program operation and a Dynamic Start Voltage (DSV) Sample Flag. The program parameters are stored in SRAM 150. In an embodiment, the Dynamic Start Voltage (DSV) Sample Flag is one bit stored in a register in reserved memory in the SRAM 150 with other flags used internally by the 3D NAND device 100 to perform the program operation.

In the first stage of a current program operation, the stored program parameters used to perform a previous program operation are compared with program parameters to perform the current program operation to select the operations to be performed in the first stage of the current program operation.

The program parameters to perform a program operation in an SLC NAND Flash memory device are dynamically selected by a Full Prologue operation that calculates all the voltage, timing, and other logical components and stores the results in the SRAM 150 to be used by other prologue operations, a short Prologue operation that performs DSV based Vpgm/Vpass updates, a Mini Prologue operation that performs a WL based Inhibit Scheme load, or a fast Prologue operation that does not perform additional operations.

At block 900, the block number for the current program operation is compared with the block number for the previous program operation that is stored in SRAM 150. If the block information is the same, processing continues with block 902. If not the same, processing continues with block 914.

At block 902, the Word-Line-Group Program (WGP) number for the current program operation is compared with the Word-Line-Group Program (WGP) number for the previous program operation that is stored in SRAM 150. If the Word-Line-Group Program (WGP) number is the same, processing continues with block 904. If not the same, processing continues with block 912.

At block 904, the state of the Dynamic Start Voltage (DSV) Sample Flag a stored in SRAM 150 is read from SRAM 150. If the DSV Sample Flag is set to '1', a new DSV was sampled in previous program, processing continues with block 914. If the "DSV Sampling Prev" flag is set to '0', a new DSV was not sampled in previous program operation, processing continues with block 906.

At block 906, if the current program operation is to be performed on the same Block/Word Line Group (WLG) and word line (WL) as the previous program operation, processing continues with block 908. If the current program operation is to be performed on the same Block/WLG but a different WL than the previous program operation, processing continues with block 916.

At block 908, a fast prologue operation is performed. The fast prologue operation uses the program parameters used to perform a previous program stored in SRAM 150 and the DSV based Vpgm/Vpass updates computed in block 916. Processing continues with block 910.

At block 910, the program operation(s) and the verify operation(s) are performed on the portion of NAND cells using the computed program parameters. Processing continues with block 918.

At block 912, block information and/or Word-Line-Group Program (WGP) number are not the same for the current program and the previous program. A full first stage operation is performed which takes ~50 us. The full first stage operation computes the different voltages (Vpgm/Vpass/PV/VpassR etc.) to bias the NAND array, different timings required for analog ramps (WL/BL/SRC/SGx etc.), updates word-line control latches for the Inhibit Schemes in the control circuitry 104, and stores the results in SRAM 150 to be used by block 908 for the next program operations. All these Voltage/Timing calculations could be different for different WL-Groups but should be the same for all the pages that belong to the same WL-Groups, if only one WGR (WL-Group Read) is mapped with one WGP (WL-Group Program), while more than one WGP can be mapped to one WGR.

At block 914, a short prologue operation is performed. The new DSV value is added to Start-Vpgm, the corresponding Vpass voltages are computed using the new DSV value, and the final Vpgm and Vpass voltage values are stored in the SRAM 150 to be used in block 908. Processing continues with block 906.

At block 916, a mini prologue operation which takes ~13 micro seconds is performed. The current program operation is to be performed on the same Block/WGP but a different WL than the previous program operation, word-line control latches are updated with the Inhibit Schemes to align with the selected WL. Processing continues with block 908.

At block 918, third stage operations are performed to discharge excess charge from program circuitry, for example, turn off charge pumps for a portion of NAND cells.

In an embodiment, in which 6.6 word lines (WLs) are grouped in one word line group (WGP), a full first stage operation is performed once every 6.6 WLs, the DSV based Vpgm/Vpass updates occur once every 6.6 WLs, and the Inhibit Scheme loading occurs once every WL. The mini first stage operation is used to program all of the pages in a WGP except for the first program operation that uses the full first stage operation. The effective first stage time is reduced by 11.3% compared to performing a full first stage operation for the first subblock of every word line and the SLC Effective tPROG is improved by 3.1%.

Figure 10:
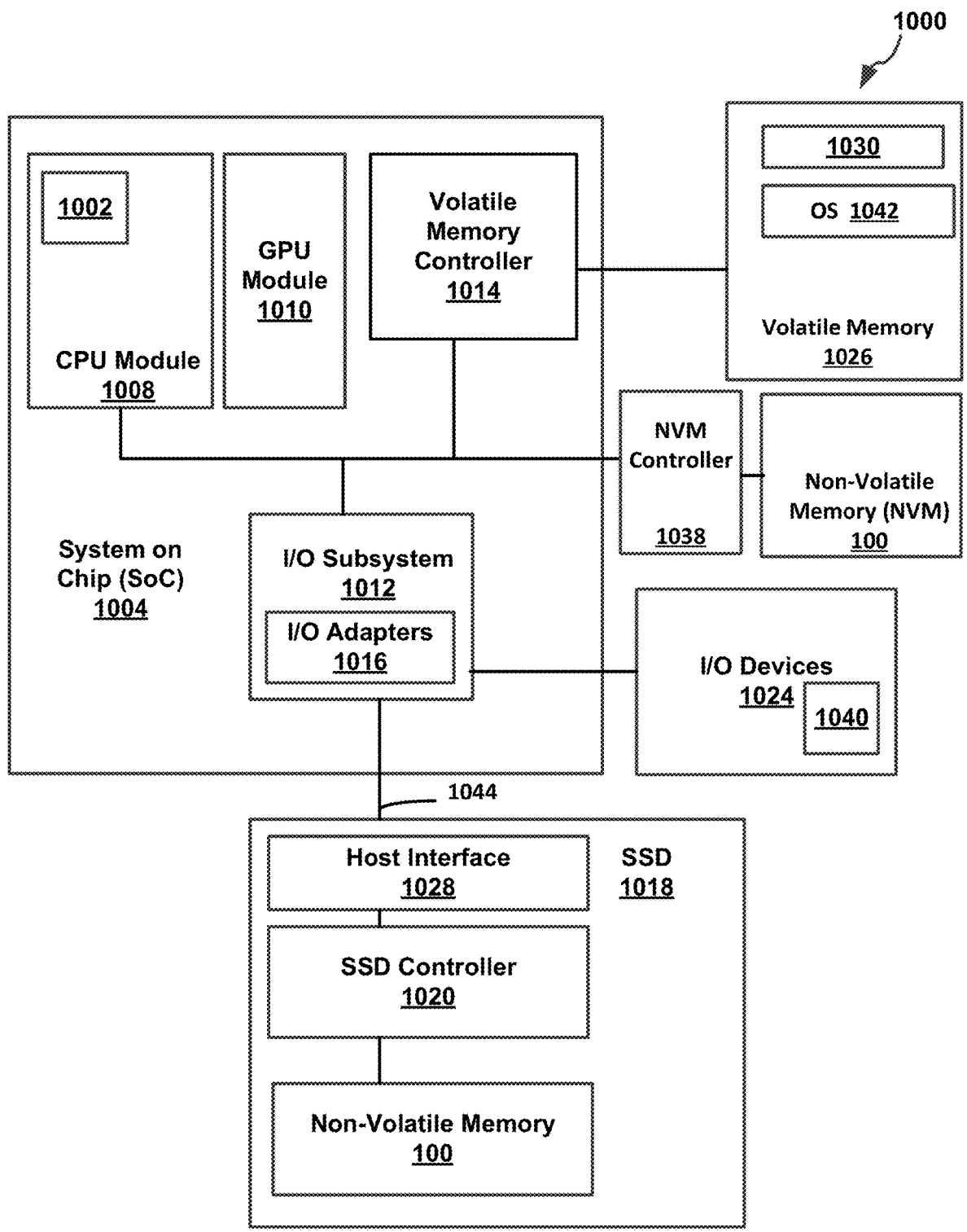
FIG. 10 is a block diagram of a computer system that includes non-volatile memory.

FIG. 10 is a block diagram of a computer system 1000 that includes 3D NAND device 100. Computer system 1000 can correspond to a computing device including, but not limited to, a server, a workstation computer, a desktop computer, a laptop computer, and/or a tablet computer.

The computer system 1000 includes a system on chip (SOC or SoC) 1004 which combines processor, graphics, memory, and Input/Output (I/O) control logic into one SoC package. The SoC 1004 includes at least one Central Processing Unit (CPU) module 1008, a volatile memory controller 1014, and a Graphics Processor Unit (GPU) 1010. In other embodiments, the volatile memory controller 1014 can be external to the SoC 1004. Although not shown, each of the processor core(s) 1002 can internally include one or more instruction/data caches, execution units, prefetch buffers, instruction queues, branch address calculation units, instruction decoders, floating point units, and retirement units. The CPU module 1008 can correspond to a single core or a multi-core general purpose processor, such as those provided by Intel® Corporation, according to one embodiment.

The Graphics Processor Unit (GPU) 1010 can include one or more GPU cores and a GPU cache which can store graphics related data for the GPU core. The GPU core can internally include one or more execution units and one or more instruction and data caches. Additionally, the Graphics Processor Unit (GPU) 1010 can contain other graphics logic units that are not shown in FIG. 10, such as one or more vertex processing units, rasterization units, media processing units, and codecs.

Within the I/O subsystem 1012, one or more I/O adapter(s) 1016 are present to translate a host communication protocol utilized within the processor core(s) 1002 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 1016 can communicate with external I/O devices 1024 which can include, for example, user interface device(s) including a display and/or a touch-screen display 1040, printer, keypad, keyboard, communication logic, wired and/or wireless, storage device(s) including hard disk drives ("HDD"), solid-state drives ("SSD") 1018, removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (Non-Volatile Memory Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.10-based wireless protocols; and cellular protocols.

The I/O adapter(s) 1016 can also communicate with a storage device, which can be a hard disk drive (HDD) or a solid-state drive ("SSD") 1018 which includes a SSD controller 1020, a host interface 1028 and a 3D NAND device 100.

The computer system 1000 can include a 3D NAND device 100 and a non-volatile memory controller 1038 communicatively coupled to the CPU module 1008 in the SoC 1004. The 3D NAND device 100 can be included in a dual in-line memory module (DIMM) that can be referred to as a non-volatile dual in-line memory module (NVDIMM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND Flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional crosspoint memory device, or other byte addressable write-in-place memory (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The I/O adapters L16 can include a Peripheral Component Interconnect Express (PCIe) adapter that is communicatively coupled using the NVMe (NVM Express) over PCIe (Peripheral Component Interconnect Express) protocol over bus 1044 to a host interface 1028 in the solid state drive 1018. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

Applications 1030 and an operating system (OS) 1042 can be stored in volatile memory 1026. Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

An operating system 1042 is software that manages computer hardware and software including memory allocation and access to I/O devices. Examples of operating systems include Microsoft® Windows®, Linux®, iOS® and Android®.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:
1. An apparatus comprising:
a memory array, the memory array including a plurality of blocks of NAND cells; and
circuitry including a memory, wherein the circuitry is configured to;
implement a first program operation including a full first stage operation to program NAND cells in the memory array;
determine a plurality of parameters, for programming the NAND cells, based on the first program operation; and
perform an ordered sequence of second program operations including at least two different types of first stages implemented using the plurality of parameters, wherein a respective second program operation has a lower read and program latency of than the first program operation.

2. The apparatus of claim 1, wherein the full first stage operation includes a set of operations to compute all of the plurality of parameters.

3. The apparatus of claim 1, wherein a first stage of one of the ordered sequence of second program operations includes a short first stage operation, and the short first stage operation includes using the plurality of parameters determined based on the full first stage operation and determining Dynamic Start Voltage (DSV) based updates for a program voltage that is applied to a selected word line in the memory array and for a pass gate read voltage that is applied to non-selected word lines in the memory array.

4. The apparatus of claim 1, wherein a first stage of one of the ordered sequence of second program operations includes a mini first stage operation, and the mini first stage operation includes using the plurality of parameters determined based on the full first stage operation by applying a program voltage on a selected word line in the memory array and an Inhibit Scheme on unselected word lines in the memory array.

5. The apparatus of claim 1, wherein a first stage of one of the ordered sequence of second program operations includes a fast first stage operation, and the fast first stage operation includes using the plurality of parameters determined based on the full first stage operation.

6. The apparatus of claim 1, wherein the circuitry is configured to use the plurality of parameters to perform a verify operation in a second stage of at least one of the ordered sequence of second program operations.

7. The apparatus of claim 1, wherein the NAND cells are Single-Level Cells and the first program operation is a Single-Level Cell program operation.

8. A system comprising:
a memory controller; and
a NAND device coupled with the memory controller, the NAND device comprising:
a memory array, the memory array including a plurality of blocks of NAND cells; and
circuitry including a memory to store a plurality of parameters associated with a first program operation to program NAND cells in the memory array, wherein the circuitry is configured to:
implement the first program operation including a full first stage operation;
determine the plurality of parameters, for programming the NAND cells, based on the first program operation; and
perform an ordered sequence of second program operations including at least two different types of first stages implemented using the plurality of parameters, wherein a respective second program operation has a lower read and program latency of than the first program operation.

9. The system of claim 8, wherein the full first stage operation includes a set of operations to compute all of the plurality of parameters.

10. The system of claim 8, wherein a first stage of one of the ordered sequence of second program operations includes a short first stage operation, and the short first stage operation includes using the plurality of parameters determined based on the full first stage operation and determining Dynamic Start Voltage (DSV) based updates for a program voltage that is applied to a selected word line in the memory array and for a pass gate read voltage that is applied to non-selected word lines in the memory array.

11. The system of claim 8, wherein a first stage of one of the ordered sequence of second program operations includes a mini first stage operation, and the mini first stage operation includes using the plurality of parameters determined based on the full first stage operation by applying a program voltage on a selected word line in the memory array and an Inhibit Scheme on unselected word lines in the memory array.

12. The system of claim 8, wherein a first stage of one of the ordered sequence of second program operations includes a fast first stage operation, and the fast first stage operation includes using the plurality of parameters determined based on the full first stage operation.

13. The system of claim 8, wherein the circuitry is configured to use the plurality of parameters to perform a verify operation in a second stage of the first program operation.

14. The system of claim 8, wherein the NAND cells are Single-Level Cells.

15. The system of claim 8, further comprising:
one or more of:
a processor,
a power supply, and
a display coupled with the NAND device.

16. A method, comprising:
implementing a first program operation including a full first stage operation to program NAND cells in a memory array in a NAND device, the memory array including a plurality of blocks of NAND cells;
determining a plurality of parameters, for programming the NAND cells, based on the first program operation;
performing an ordered sequence of second program operations including at least two different types of first stages implemented using the plurality of parameters, wherein a respective second program operation has a lower read and program latency of than the first program operation.

17. The method of claim 16, wherein the full first stage operation includes a set of operations to compute all of the plurality of parameters.

18. The method of claim 16, wherein a first stage of one of the ordered sequence of second program operations includes a short first stage operation, and the short first stage operation includes using the plurality of parameters determined based on the full first stage operation and determining Dynamic Start Voltage (DSV) based updates for a program voltage that is applied to a selected word line in the memory array and for a pass gate read voltage that is applied to non-selected word lines in the memory array.

19. The method of claim 16, wherein a first stage of one of the ordered sequence of second program operations includes a mini first stage operation, the mini first stage operation to use the plurality of parameters determined based on the full first stage operation by applying a program voltage on a selected word line in the memory array and an Inhibit Scheme on unselected word lines in the memory array.

20. The method of claim 16, wherein a first stage of one of the ordered sequence of second program operations includes a fast first stage operation, and the fast first stage operation to includes using the plurality of parameters determined based on the full first stage operation.

* * * * *